Figure 1:
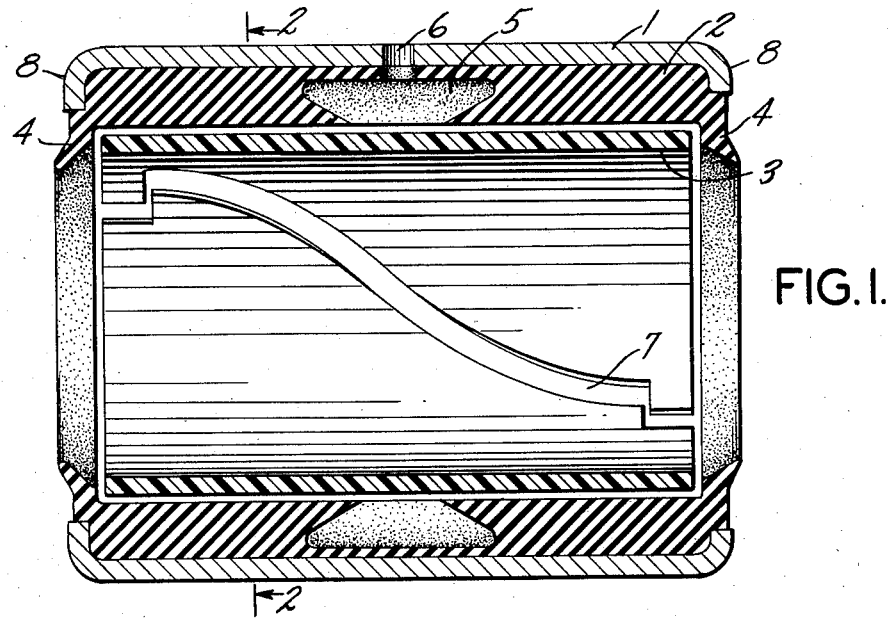

Sept. 9, 1958  J. B. THOMSON  2,851,314
RESILIENTLY BACKED PLASTIC BEARING
Filed Sept. 28, 1953  2 Sheets-Sheet 1

INVENTOR.
JOHN B. THOMSON
BY Morgan, Finnegan, Durham & Pine
his ATTORNEYS.

Sept. 9, 1958 J. B. THOMSON 2,851,314
RESILIENTLY BACKED PLASTIC BEARING
Filed Sept. 28, 1953 2 Sheets-Sheet 2

*INVENTOR.*
JOHN B. THOMSON
BY Morgan, Finnegan, Durham
& Pine
his ATTORNEYS

United States Patent Office 2,851,314
Patented Sept. 9, 1958

2,851,314

RESILIENTLY BACKED PLASTIC BEARING

John B. Thomson, Manhasset, N. Y.

Application September 28, 1953, Serial No. 382,640

7 Claims. (Cl. 308—26)

The present invention relates to a novel and improved bearing having a resiliently mounted plastic bearing surface or liner.

This application is a continuation-in-part of copending application Serial No. 128,356, filed November 19, 1949, now Patent 2,675,283, dated April 13, 1954.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The present inevntion has for its object the provision of a novel and improved plastic bearing which automatically compensates for wear, may be preloaded, allows a moderate degree of self-alinement and is relatively shock absorbent. A further object is the provision of a bearing which under moderate loads requires no lubrication, preserves its fit on the mating shaft indefinitely, is not subject to premature failure as the result of fatigue, and does not pound or hammer out under vibration or impact. A further object is the provision of a bearing in which repeated kneading or twisting action due to torque variations does not fatigue a resilient backing member to cause premature failure as is common in conventional bearings of this general type. The invention further provides a bearing structure which can be produced by selective assembly technique to permit economical production of bearings having close tolerances, with either a preloaded condition utilizing interference fits or with normal, closely held clearances between the bearing and the shaft. Also, the invention further provides a resiliently backed bearing surface which is flexible, split and circumferentially movable with respect to its backing, and can be flexed out of round and flexes to maintain an exact fit to the roundness inaccuracies of the supported shaft. Still another object is the provision of a plastic lined bearing structure which may incorporate a large capacity storage well for lubricant which is automatically distributed over the entire bearing surface.

Bearings made in accordance with the preferred form of the present invention when used under preload conditions with interference fits, automatically seal out dirt and contamination, thereby preserving the bearings' low friction characteristics and adding greatly to the life of the bearing. Furthermore, the bearings of the present invention, as contrasted with other bearings utilizing resilient members, are not subject to premature failure through fatigue caused by the constant kneading or twisting action of torque variation as in ordinary bearings of this type. The bearings of the present invention present a completely inert surface to the mating shaft, avoiding rust, corrosion, rot, freezing, fretting corrosion and electrolytic action.

In general, bearings in accordance with the present invention comprise an outer housing, a resilient rubber-like member within the housing, and an inner liner of a tough, corneous, wear-resistant, flexible and resilient plastic bearing material which is relatively thin in relation to its circumference and is circumferentially movable with respect to its supporting member, being provided with a slot of a width, when in operating position, at least as great as the circumferential thermal or moisture expansion of the plastic liner under operating conditions plus the amount equal to the circumferential change due to diameter variations of the shaft and bearing bore. The resilient member is positioned to press the liner toward the shaft, and means are provided to restrain the resilient member and the plastic liner from axial movement with respect to the bearing housing.

All shafts in which bearings operate have some degree of out of roundness and on low and moderate cost items where superprecision grinding cannot be justified, the extent of the out of roundness is a serious factor in the deterioration of conventional bearing-shaft combinations. This is due to load concentration on high points, hammering action, and inclusion of foreign matter at low points. A very important and unique feature of this invention is the bearing's ability to flex and weave with the rotation so as to at all times conform perfectly to the irregular rotating surface running against it. This is only possible due to the unusual combination of a split and resilient liner that is circumferentially movable in relation to its resilient backing. It will be noted that resilient bearings previously used do not afford this rotating conformability feature as the bearing surface is usually bonded or made of a hard material or does not incorporate a split of sufficient width to permit circumferential variations which accompany the flexing. The bearing of this invention assures uniform load distribution, non-hammering action, and complete dirt sealing.

The resilient, rubber-like member is preferably molded from synthetic or natural rubber, vulcanized or otherwise stabilized to provide a moderately soft mass which is not subject to appreciable cold flow and is not subject to deformation by heat over the range of operating temperatures. A tough grade of suitably filled natural rubber or a synthetic rubber such as Buna S, Hycar, GRS, or butyl is suitable, or under conditions where oily lubricants, especially hydrocarbon petroleum oils are used, the resilient member may be formed from neoprene, or other rubber-like synthetic materials. This rubber-like member is preferably molded to the desired shape so that its exterior conforms to the housing or other member in which it is to be mounted, while its interior is shaped to receive, support and hold the plastic liner which forms the actual bearing surface, and is thus usually provided with a cylindrical recess into which a thin plastic liner may be slipped and held by the outward resilient expansion of the liner.

The bearing liner which forms the actual antifriction surface of the bearing is formed from a tough, corneus, wear-resistant, flexible and resilient, plastic material, which is preferably a thermoplastic such as nylon or other linear polyamide, and is molded to substantially the same curvature as it will have when in use, is relatively thin and is in an unstretched condition so that it has no substantial tendency permanently to change its size or shape with time or when subjected to normal operating temperatures. The liner is always formed with at least one split or gap portion extending from end to end of the bearing liner, the gap being somewhat greater in circumferential extent than the circumferential expansion of the bearing liner in use as determined by its operating temperature or moisture conditions. The polyamide or nylon resin used for the plastic liner is preferably a highly rigid, corneous formulation such as "FM 10001 nylon" which is thermoplastic but has a relatively sharp melting point and does not exhibit substantial progressive flow with temperature increases even above 160° F. and is substantially form stable even at 400° F. The plastic liner is flexible, has a quick return after being bent, is resistant to abrasion and impact and is substantially relaxed, or stress-relieved due to the manner of molding the liner. Other nylons which are suitable are "FM 3604" and "FM 3001." Other synthetic, thermoplastic resinous materials are suitable for certain applications, such as polyethylene, polystyrene and methyl methacrylate.

Figure 2:
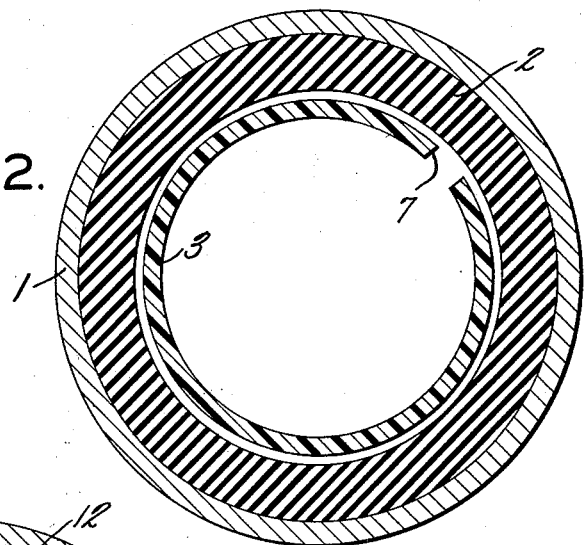
Figure 3:
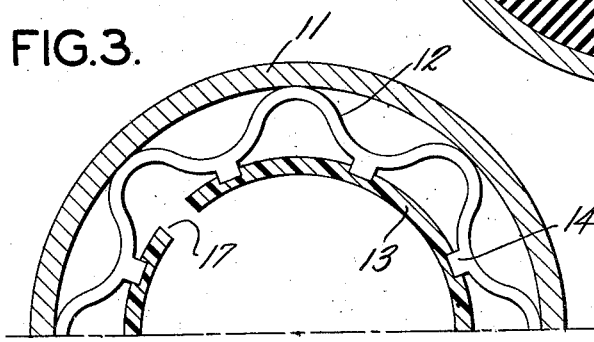
Figure 4:
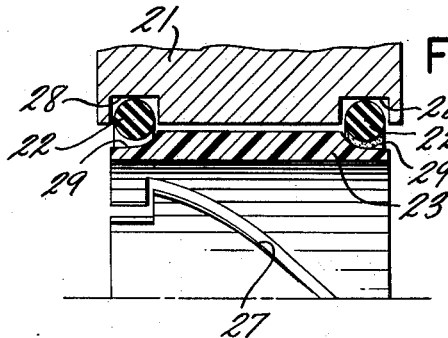
Figure 5:
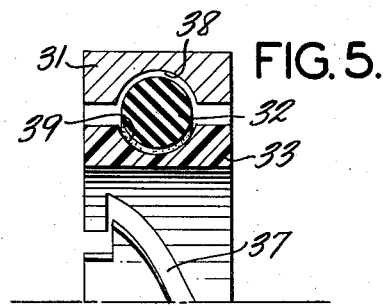
Figure 6:
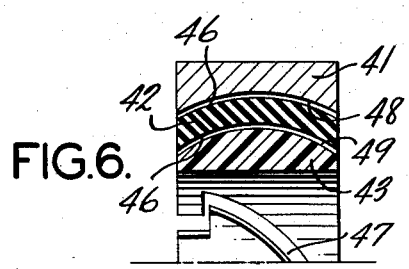
Figure 7:
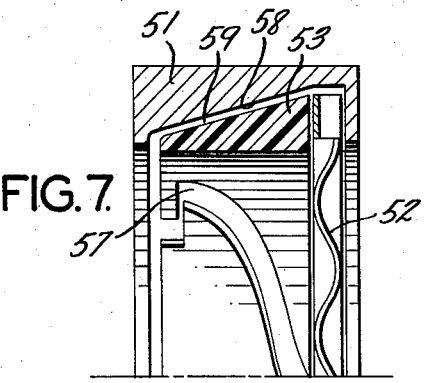

In the accompanying drawings,

Figure 1 is a longitudinal section through a bearing constructed in accordance with the teachings of the invention, Figure 2 is a transverse section through the bearing taken along the line 2—2 of Figure 1 looking in the direction of the arrows, Figure 3 is a transverse section through the upper portion of a modification of the invention showing a different type of resilient member, Figure 4 is a longitudinal section through the upper portion of another modification of the invention, Figure 5 is a longitudinal section of a bearing showing another modified form of resilient member, Figure 6 is a longitudinal section through a bearing showing still another modification of the invention designed to provide wide angular self-aligning characteristics, and Figure 7 is a longitudinal section through a bearing showing a modification of the invention in which the bearing is constructed for absolute rigidity.

Referring first to Figure 1 there is shown an outer shell or sleeve member 1. A resilient member 2, made of rubber or some other suitable material, lies within the inner peripheral surface of the outer sleeve and forms a bearing liner therefor. Inturned edges 8 on the sleeve member 1 hold the resilient member securely in place. The resilient member 2 is provided at each end with inturned lips 4 which may have extremities protruding inwardly far enough to make rubbing contact with the shaft to form a seal for the retention of lubricant and exclusion of foreign matter. These inturned lips 4 also serve to hold the liner 3 against axial movement. An annular recess 5 is provided for the storage of a considerable volume of lubricant, and this recess is connected to an opening 6 to enable initial and subsequent lubrication. Inner or bearing member 3 is a tubular member of plastic material such as nylon and is provided with one or more compensation gaps 7 extending throughout the length of the member. This member fits within the resilient member 2 with enough clearance as to be movable with respect thereto. This clearance between the bearing member 3 and the resilient member 2 and the compensation gap 7 are more clearly shown in Figure 2.

Figure 3 illustrates a modified version of the bearing comprising an outer sleeve member 11 in combination with a corrugated spring type resilient member 12 supporting the bearing member 13 which has a longitudinal split 17. In this construction, member 12 would be restrained from longitudinal movement by inturned ends of the outer sleeve, as illustrated in Figure 1 and member 13 is restrained from longitudinal movement by inturned tabs 14 on member 12.

In Figure 4 the outer member 21 is a housing in which the bearing 23 is mounted. The housing is provided with annular grooves 28 which locate resilient members 22. In this instance, the members preferably are rubber rings. A bearing member 23 is disposed between the rings 22 and is supported thereby. Alignment of the bearing member is effected by the provision of semi-circular surfaces 29 thereon which engage the resilient rings 22 and prevent longitudinal displacement of the bearing.

Figure 5 is a modification of Figure 4 showing a bearing of shorter length in which only a single resilient ring 32 is utilized. A cooperating groove 38 is provided in the member 31 and a semi-circular surface 39 is provided on the bearing member 33 to align the bearing on the ring.

In the modification of the invention shown in Figure 6 the bearing member 43 and the housing 41 have arcuate surfaces 49—48 respectively. Interposed between these arcuate surfaces is a resilient member 42 having arcuate outer surfaces 46 to conform with the surfaces 49—48 on the bearing and the housing members. This construction enables the member 43 to swing about its center thus providing a great degree of self-alignment.

Figure 7 shows a modification in which the housing member 51 has a tapered inner periphery 58 and the bearing member has a correspondingly tapered outer surface 59. In this form of the invention, the resilient member 52 comprises a corrugated annular spring located to the right of bearing member 53 and pressing the bearing member leftwardly into contact with the tapered surface 58 thereby creating a constant inward pressure on the shaft.

The invention in its broader aspects is not limited to the specific mechanisms shown and described but departures may be made therefrom within the scope of the accompanying claims without departing from the principles of the invention and without sacrificing its chief advantages.

What is claimed is:

1. A bearing adapted to have a shaft mounted therein comprising an outer housing, an inner liner of nylon fitted to and circumferentially movable within said housing, means restraining the liner from axial movement, said liner being adapted for precision fitting to said shaft and being very thin in relation to its circumference and provided with a longitudinal slot extending from end to end and of a width at least as great as the circumferential expansion of the nylon liner under operating conditions, and a resilient backing member within the housing and supported thereby and surrounding said inner liner.

2. The bearing as claimed in claim 1, in which the means for restraining the inner liner from axial movement comprises inwardly extending annular portions at each end of said resilient backing member.

3. The bearing as claimed in claim 1, in which the housing is provided at each end with an inwardly extending annular peripheral portion for holding the resilient backing member in place.

4. The bearing as claimed in claim 1 wherein the housing and resilient backing member are provided with registering openings therethrough, for a lubricant.

5. The bearing as claimed in claim 1, wherein the resilient backing member is provided with an annular recess for supplying lubricant to said inner liner, and wherein the housing is provided with an opening for supplying lubricant to said annular recess.

6. A bearing adapted to have a shaft mounted therein comprising an outer housing, an inner lining of nylon fitted to and circumferentially movable within said housing, means restraining the liner from axial movement, said liner being adapted to be closely fitted to the shaft and being very thin in relation to the circumference of the liner and said liner being provided with slotted portions extending from end to end for circumferential expansion at all points across the axial length of the liner, the slotted portions providing a gap at least as great as the circumferential expansion of the nylon liner under operating conditions, and a resilient backing member within the housing and supported thereby and surrounding said inner liner.

7. The combination of claim 6, wherein the means for restraining the liner from axial movement comprises inwardly extending annular portions at each end of said resilient backing member.

(References on following page)

References Cited in the file of this patent

UNITED STATES PATENTS

| | | |
|---|---|---|
| 1,298,100 | Royce | Mar. 25, 1919 |
| 1,483,903 | Masury | Feb. 19, 1924 |
| 1,871,861 | Rossman | Aug. 16, 1932 |
| 1,985,781 | Hufferd et al. | Dec. 25, 1934 |
| 1,998,728 | Marles | Apr. 23, 1935 |
| 2,246,086 | Austin | June 17, 1941 |
| 2,580,119 | Meyers | Dec. 25, 1951 |
| 2,675,283 | Thomson | Apr. 13, 1954 |

FOREIGN PATENTS

| | | |
|---|---|---|
| 527,466 | Great Britain | Oct. 9, 1940 |
| 498,576 | Belgium | Oct. 31, 1950 |
| 657,592 | Great Britain | Sept. 19, 1951 |

OTHER REFERENCES

Motor Magazine, October 1951, page 90.
Product Engineering, November 1952, page 224.